United States Patent Office 3,420,866
Patented Jan. 7, 1969

3,420,866
PERFLUOROALKYL PEROXY PERFLUOROALKYL
FLUOROXY COMPOUNDS
Julianne H. Prager, Arden Hills, and Phillip G. Thompson, St. Paul, Minn., assignors to Minnesota Mining and Manufacturing Company, St. Paul, Minn., a corporation of Delaware
No Drawing. Original application Jan. 21, 1965, Ser. No. 428,016. Divided and this application Dec. 12, 1966, Ser. No. 614,375
U.S. Cl. 260—453       4 Claims
Int. Cl. C07c 71/00

ABSTRACT OF THE DISCLOSURE

Fluoroxy-group substituted perfluoroalkyl compounds having a peroxy group in the perfluoroalkyl chain, having the formula $$X-R'_f-OO-R''_f-(OF)_n$$

wherein X is a member of the group consisting of fluorine and —OF; $R'_f$ is a perfluoroalkyl radical; $R''_f$ is a perfluoroalkyl radical, the total number of carbon atoms in $R'_f$ and $R''_f$ taken together being from 2 to 18, said radicals having straight or branched chains, and each having at least 1 carbon atom; and n is 1 or 2. The compounds have oxidizing properties together with solubility characteristics of perfluorinated compounds.

---

This is a division of application Ser. No. 428,016, filed Jan. 21, 1965.

This invention relates to fluorinated oxidant compounds and more particularly to certain novel perfluoroalkyl substituted polyoxyfluorides and the process for their production.

Trifluoromethyl oxyfluoride has been prepared by the direct fluorination of carbon monoxide and found to be a relatively stable substance. Higher members of this series have not, so far as known, been produced heretofore, nor have compounds containing a plurality of oxyfluoride groups been prepared.

It is an object of this invention to provide certain highly fluorinated polyoxyfluoride compounds. It is another object of this invention to provide new fluorinated oxidants. It is a further object of the invention to provide a process for the production of oxyfluoride compounds. Other objects of the invention will become apparent from the disclosures hereinafter made.

It has been found that compounds having the formula $$R_f(OF)_n$$

wherein $R_f$ represents a member of the group consisting of perfluorinated alkyl radicals having from 1 to 18 carbon atoms, and n is an integer from 2 to 12, are extremely useful fluorinated oxidizing agents.

Included within the scope of the invention are compounds which have polymeric chains, included in the backbone of which are repeating units having the formula

wherein $R'_f$ is a divalent perfluorinated radical having from 2 to 18 carbon atoms corresponding to $R_f$.

The compounds of the invention range in physical properties from gases to oily or waxy materials, or solids when they are of higher molecular weight.

In the general formula set forth above, $R_f$ is a perfluoroalkyl radical. Fully equivalent with acyclic perfluoroalkyl radicals for the purpose of the invention are perfluoroalkyl radicals containing perfluorinated carbocyclic and heterocyclic rings, for example, perfluoropyridyl, perfluorocyclohexyl, perfluorocyclohexylethyl and the like radicals. Perfluoroalkyl radicals containing other atoms in the chain are also equivalent for the purposes of this invention; for example, peroxy, oxa, aza and the like atoms or groups of atoms can be present.

Likewise, the perfluoroalkyl radicals can be substituted by certain electronegative groups, which may replace one or more fluorine atom or $CF_3$ groups. They are characterized by being free from hydrogen, non-reducing with respect to the —OF group, and having a Hammett meta sigma parameter equal to or greater than +0.3. (Reference is here made to the report of H. H. Jaffe, Chemical Reviews, vol. 53, pp. 191–261, 1953.) Such groups include $-NF_2$, $=NF$, $-NO_2$, $-ONF_2$, perchloryl, peroxy and the like groups. These substituents when present do not interfere with the fluorination of the starting compound, and may contribute significant additional oxidizing power to the compounds of the invention. Perfluoroalkyl radicals thus substituted are included within the scope of $R_f$ as above defined.

As noted hereinabove, while trifluoromethyloxyfluoride has been prepared, and found to be sufficiently stable to permit of manipulation, higher homologs of this compound have not been obtained heretofore. While the formula for such compounds has been set forth, for example, in the report of Cady, Proceedings of the Chemical Society, April, 1960, pages 133–138, it was stated in the same report that no compound of this type other than perfluoromethyloxyfluoride has been obtained.

An interesting sub-group of compounds according to the invention and prepared by the process thereof is that in which a peroxy group is present in the perfluoroalkyl chain. These compounds are represented by the formula $$X-R'_f-OO-R''_f-(OF)_n$$

wherein X is a member of the group consisting of fluorine and —OF; $R'_f$ is a perfluoroalkyl radical; and $R''_f$ is a perfluoroalkyl radical, the total number of carbon atoms in $R'_f$ and $R''_f$ taken together being from 2 to 18, these radicals being straight or branched chain, and each having at least one carbon atom; and n is 1 or 2. These compounds have increased oxidizing power owing to the presence of the peroxy group.

Illustrative compounds of this type include perfluoromethyl fluoroxydifluoromethyl peroxide ($CF_3OOCF_2OF$), perfluoroisopropyl fluoroxydifluoromethyl peroxide $$(CF_3CF(CF_3)OOCF_2OF)$$

perfluoroethyl 1 - (1 - fluoroxydifluoromethyl)tetrafluoroethyl peroxide ($C_2F_5OOCF(CF_3)CF_2OF$), fluoroxydifluoromethyl 1-fluoroxytetrafluoroethyl peroxide $$(FOC_2F_4OOCF_2OF)$$

bis(1-fluoroxytetrafluoroethyl) peroxide $$(FOC_2F_4OOC_2F_4OF)$$

and the like.

A particularly preferred group of compounds of the invention is that in which two oxyfluoride groups are attached to the same carbon atoms, as shown by the formula

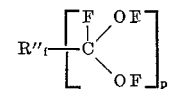

wherein $R''_f$ is a p-valent perfluoroalkyl radical which, when taken together with the carbon atoms to which the fluoroxy groups are attached, otherwise corresponds to $R_f$ described hereinabove, and p is a positive integer up to 6. These compounds have significantly higher oxidizing power.

The present invention includes within its scope a process for the production of fluorinated compounds containing one or more oxyfluoride groups. This process is, so far as applicants are aware, uniquely capable of producing stable higher molecular weight oxyfluorides and polyoxyfluorides.

Thus, contrary to the observations of the prior art, it has now been found that by using the process herein set forth, it is possible to obtain the formerly inaccessible members of this series. While applicants do not wish to be bound by theory, it is believed that this process produces the compounds in a condition free from agents which cause fragmentation. It is well known that fluorination processes are extremely severe and destructive to the compounds being fluorinated. In addition to the desired products, numerous fragmentation products are commonly formed by reaction with the apparatus itself. Among the various products which are formed or are already present, it is believed there are agents which catalyze or initiate the decomposition of the higher perfluoroalkyl oxyfluorides. Consequently, before the latter compounds can be isolated, they react or decompose and thus they cannot be recovered from the reaction mixtures.

Certain hydrogen-containing materials are fragmentizing agents which cause higher perfluoroalkyl oxyfluorides to decompose completely. Decomposition can be followed by observing the change in pressure of the system, inasmuch as two moles of decomposition products are formed for every mole of pentafluoroethyl oxyfluoride decomposed; or by examining the infrared spectrum of the mixture. Furthermore, vapor phase chromatography can be used to isolate and identify the products of the fragmentation process. Thus, for example, pentafluoroethyl oxyfluoride substantially free from fragmentizing agents is unchanged during storage at room temperature for many months. Addition of an equimolar amount of methane causes pentafluoroethyl oxyfluoride to decompose. Not only can carbonyl fluoride and tetrafluoromethane be isolated from the decomposition products by means of the vapor phase chromatographic procedure, but methane is also recovered in substantial amount. No other compounds are observed except in minute amounts. Similar results are obtained with as little as 0.04 mole of methane, per mole of $C_2F_5OF$.

Conversely, when methane is mixed with trifluoromethyl oxyfluoride, the mixture is found to be stable at room temperature in the absence of a spark or of ultraviolet irradiation.

Other compounds which bring about the decomposition of higher perfluoroalkyl oxyfluorides include methyl trifluoroacetate, hydrocarbon-type stopcock greases, such as Apiezon grease, some inorganic fluorides and polyvinyl chloride. It has been found that decomposition or fragmentation can even occur in the very short time during which the fraction containing the desired higher oxyfluoride, e.g., pentafluoroethyl oxyfluoride, passes between the separating column and the collection trap, when polyvinyl chloride tubing was used for connecting the exit of the chromatography apparatus to the collection system. When this was replaced by polytetrafluoroethylene tubing, pure pentafluoroethyl oxyfluoride free of carbonyl fluoride and tetrafluoromethane was isolated. This phenomenon of the fragmentation of higher perfluoroalkyl oxyfluorides at the C—C bond adjacent to the OF group, by certain fragmentizing agents, is surprising and is believed to have been unpredictable from consideration of the behavior of trifluoromethyl oxyfluoride or other fluorine-containing compounds, such as those containing =NF or —SF groups.

The process herein employed utilizes certain low temperature and other conditions throughout the fluorination, isolation and purification steps to minimize reactions between the higher perfluoroalkyl oxyfluoride products and any fragmentizing or decomposition agents present. The compounds can therefore be isolated in a state free from decomposition or fragmentation catalyst or initiators, so that these desired compounds are obtained in relatively stable, useful form.

Broadly speaking, the process of the invention consists in direct fluorination of compounds having a molecular structure in which at least one oxygen atom is directly linked to a carbon atom. The longest continuous directly oxygen-linked carbon chain of the starting compound can contain at least as many carbon atoms as are desired in the longest continuous chain directly linked to the OF group in the final product. However, it has been observed that coupling or combination of the carbon chains may occur in the process, so that carbon-containing chains longer than those of the starting materials are produced.

The starting materials can be more specifically represented by the formula

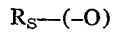
$$R_S-(-O)$$

wherein —(-O) represents oxygen directly linked to carbon, and wherein $R_S$ represents a starting radical having from 1 to 18 carbon atoms in the longest chain thereof and may be a perfluoroalkyl radical as defined herein. These compounds are directly fluorinated under certain mild conditions at temperatures below about 50° C., to form compounds of the formula

$$R_f(OF)_m$$

wherein $R_f$ has the significance hereinbefore described and $m$ is a positive integer.

Examples of oxygen linked directly to carbon for the purpose of the invention include carbonyl, carboxyl, ester, orthoester, carbinol and the like linkages.

The compounds of the invention are prepared by direct fluorination of oxygen-containing compounds in many cases having structures and substituents corresponding to those desired in the final product. Thus, for example, the direct fluorination of perfluoro-t-butyl alcohol yields perfluoro-t-butyl oxyfluoride; direct fluorination of perfluorodipropyl ketone produces 4-fluoroxyperfluoroheptane; direct fluorination of hexafluoro acetone produces perfluoroisopropyl oxyfluoride as well as perfluoroethyl oxyfluoride, etc. As noted, however, some of the substituent groups can be formed in the fluorination process.

When salts of polyacrylic acid are employed as a starting material, there are produced polyoxyfluoride compounds having polymer chains with repeating units having the formula

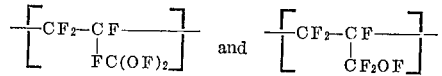

The number of such units present depends on the molecular weight of the polymer used and the severity of fluorination conditions. Some splitting of chains to lower molecular weight moieties can be expected. Other polyacids, such as polymethacrylic acid, polyitaconic acid, and the like can be used and give similar results. These materials are likewise used in the form of their salts.

Illustrative of other useful starting materials are sodium nitrodifluoroacetate, polyvinyleneglycol, cyclopentanepentone hydrate, ethanol, alloxan, salts of perfluorosebacic acid; orthoesters of fluorocarbon monocarboxylic acids such as methyl orthoperfluorobutyrate and the like; dihydroperfluoroalkanols such as 1,1-dihydroperfluorobutanol, 1,1-dihydroperfluorododecanol, 1,1-dihydro-n-undecafluorohexanol and the like; alkyl hemiacetals of perfluoroalkyl aldehydes such as heptafluorobutyraldehyde ethylhemiacetal and the like; salts of monochloropropionic acid; salts of fluorocarbon acids such as perfluorohexanoic acid and perfluorodecanoic acid, and the lower alkly esters of these acids; salts of benzenehexacarboxylic acid; dipotassium salt of nitroacetic acid; fluoral hydrate; sodium fluorodichloroacetate; 3,4-diketocyclobuten-1,2-diol and its disodium salt; hexapotassium salt of hexahydroxybenzene; 2,2-dinitropropane-1,3-diol; mono- and di-potassium salts of nitromalonic acid; 2-chloro-2,3,3-trifluorobutane-1,4-diol; disodium salt of tetrafluorodiglycolic acid; dipotassium salt of rhodizonic acid; disodium salt of croconic acid; calcium salt of chloranilic acid; trisodium salt of trihydroxytrinitrosobenzene; monoxime of cyclopentanetrione; perfluoroisopropyl nitrite; disodium ketomalonate; calcium oxamate; 1,2-bis(difluoramino)ethylene glycol; disodium salt of omega, omega, omega-trifluoroacetoacetic acid; 2-nitro-1,3-diketohydrindene; potassium salt of 5-nitroorotic acid; the reaction product of methyl trifluoroacetate and sodium methoxide; diethyl carbonate; and the like.

Where two oxygen atoms are attached to the same carbon atom, as in carboxylic acid salts, mixtures of the mono-oxyfluoro and dioxyfluoro-substituted compounds may result.

Where phenolic, acidic or other salt-forming oxygen groups are present, it is preferred to use the salts as starting materials for the direct fluorination. For this purpose, alkali metal, alkaline earth metal, transition metals such as nickel and the like salts can be used. Salts are always used when carboxylic acids are employed as starting materials.

It is noted that the term "fluoroxy" is used herein as synonymous with "oxyfluoride," to describe the —OF group.

In its broad aspects, the process of the invention is carried out by treating an oxygen-containing reactant compound as described herein with elemental fluorine at a temperature in the range of about —100 to 50° C. The process is conducted in such a way as to avoid contact with or reaction with fragmentizing agents.

The fluorine and other gases used are conveniently introduced under slight positive pressure. Preferably, the fluorine is diluted with nitrogen or other inert gas such as argon or helium, or a Freon, such as dichlorodifluoromethane and the like, to give concentrations upward of about 0.1 percent, but 100 percent fluorine in the gas stream, that is, undiluted fluorine, can be used in many of the procedures described, using great caution and slow addition. In working up the product, contact with agents which catalyze fragmentation is avoided.

Residual fluorine should always be flushed out of the reactants and the apparatus, using dry nitrogen or the like, to avoid unpleasant and toxic exposure to fluorine as well as untoward effects owing to the strong oxidizing power of this substance. The apparatus used is preferably constructed from Monel metal or copper. Solid, liquid or gaseous starting materials can be used. The reactant is placed in a suitable container with diluents or suspending media, if desired, and is then contacted with fluorine for a period ranging from about 10 minutes to about 6 to 12 hours and upwards, depending on the amount of starting material charged and the ease with which the fluorination is accomplished.

Generally speaking, once the process has gone to completion, no further fluorine reacts, so that when the products are volatile and thus are swept into the traps, continuation of the flow of fluorine is not deleterious; but in the case of non-volatile solid or non-volatile liquid products excessive exposure to fluorine should be avoided to eliminate the possibility that degradative reactions may occur.

Preferably, the reaction mixture is maintained at a temperature in the range of about —100 to 50° C. The temperature selected is maintained by cooling or heating the reactor vessel, as required.

If desired, an inert liquid suspending medium can be used to suspend the finely divided oxygen-containing reactant, and the fluorine gas with or without a diluent gas is then bubbled through the suspension. Inert solid diluents, e.g., finely divided alkali metal fluorides, can also be used; some alkali metal fluorides also have catalytic action for the fluorination and in this sense are not strictly "inert." In a similar manner, inert gases can be used as diluents for gaseous reactants. Thus, for example, fluorine-inert liquids such as perfluorinated hydrocarbons, e.g., perfluorooctanes, perfluorohexanes, and the like; perfluorocyclohexane; perfluorinated cyclic ethers such as perfluorobutylfuran, perfluorinated tertiary amines such as tris-perfluoro-n-butylamine; and the like are suitable diluents.

Commercially obtainable fluorocarbons may contain an amount of material which is not inert toward fluorine, and in such cases, fluorine gas is passed through the selected fluorocarbon liquid for a time in small amounts just sufficient to render it substantially completed inert toward fluorine.

When an inert liquid diluent is employed in the process of the invention, the hyperfluorinated reaction product generally dissolves in the diluent.

In the procedure where no solvent is used, the effluent gas stream ordinarily contains the products, which are separated by traps as stated. Where solvent is employed, any insoluble material is removed by filtration and the product is recovered by evaporation of the solvent, preferably under reduced pressure. Fractionation may be necessary if separation of the products is desired. It should be noted that for some purposes, the reaction product mixture can be used as such.

The desired individual products are isolated from the reaction mixtures by techniques of fractionation, e.g., fractional condensation, employing traps cooled with Dry Ice, liquid air, ice-salt mixtures and the like where the products are low-boiling, and other appropriate temperature conditions where higher boiling liquids or solids are produced. Separation of the products of reaction is also conveniently accomplished by chromatographic techniques in small scale runs; in larger runs, other known methods of fractionation are more practical and can be used. Crude or impure products are preferably stored well below room temperature, conveniently using solid carbon dioxide or liquid nitrogen for cooling to minimize the deleterious action of fragmentizing agents. During chromatographic separation of the products, the temperature is maintained at the minimum temperature at which movement of the products through the chromatographic apparatus takes place. Alternative separation and purification can be accomplished by the usual means, taking into consideration the strongly oxidizing, sometimes explosive nature of the products, and maintaining temperatures at a minimum.

The compounds of the invention are useful as oxidants, for example, for bleaching and the like; for oxidizing agents in chemical synthesis; combined with proper fuels and binders, as oxidizers in propellants and the like. They are especially useful in areas where fluorinated chains confer advantages owing to their special properties of solubility in fluorinated solvents and reduced solubility in other solvent systems.

The following specific examples will illustrate the process and products included within the scope of the invention. In these examples, all parts are by weight unless otherwise specified.

EXAMPLE 1

Nitrosyl trifluoroacetate, B.P. 47° C./94 mm., is subjected to fluorination as follows:

The fluorination of nitrosyl trifluoroacetate is carried out using a static bed procedure in a 450-cc. copper vessel of cylindrical shape, equipped with a gas inlet tube, a gas outlet tube, and a polychlorotrifluoroethylene rupture disc. A 1.0 g. sample of nitrosyl trifluoroacetate (about 7 millimoles) is placed in a stainless steel tray in the copper fluorinating vessel. The reactor is immersed in a cooling bath at —20° C. and flushed with a stream of dry prepurified nitrogen to displace air. Fluorine (commercially available, 95 percent pure) is introduced into the nitrogen stream (using Monel metal fittings). The fluorine-nitrogen mixture is passed into the vessel and the volatile, entrained products formed are recovered from the effluent stream, which is passed through an iron tube containing granular sodium fluoride at room temperature to remove hydrogen fluoride (which is present in commercial fluorine) and then through a trap immersed in liquid air. A stream of about 3 percent (by volume) fluorine in nitrogen is passed through the reactor at a flow rate of about .02 cubic ft./min. for 7 hours (a total of 0.20 mole of fluorine). The fluorine flow is then discontinued and the cooling bath removed; the reaction vessel is thereafter purged with nitrogen for ½ hour.

The contents of the liquid air trap are maintained at liquid air temperature until they are worked up as follows: The non-condensable gases are removed from the trap at liquid air temperature under reduced pressure, and the condensate then allowed to warm slowly while it is fractionated at about 1 mm. pressure through traps designated A, B and C, successively. Trap A is cooled in a solid carbon dioxide-trichlorothylene bath at about −78° C., trap B in a bromoethane slush bath at −119° C. and trap C in liquid nitrogen at about −196° C. Trap C is found to contain about 2 millimoles of products, including pentafluoroethyl oxyfluoride. This material is isolated in pure form from the mixture by means of vapor phase chromatography. For this process a column 8'7" in length and ½" in diameter packed with perfluorotributylamine (33 percent) coated on 30–60 mesh acid-washed filter aid (diatomaceous earth) (67 percent) and maintained at about −30° C. was used. An 8-volt thermistor was used as the detector. Helium was employed as the carrier gas at a flow rate of 320 ml./min. Pentafluoroethyl oxyfluoride is thus obtained. The yield of pure pentafluoroethyl oxyfluoride thus obtained is about 16 percent of theoretical based on the amount of nitrosyl trifluoroacetate used.

The $F^{19}$ nuclear magnetic resonance spectrum of pentafluoroethyl oxyfluoride contains an absorption at $-139.4\phi$, which is assigned to the OF group. This absorption is split into a six-fold peak (in the relationship of 1,5,10,10,5,1, three superimposed quadruplets). Other absorptions are observed at $82.1\phi$ for the $CF_3$ group and $97.9\phi$ for the $CF_2$ group. The infrared spectrum of this material shows an absorption at 11.15 microns, which is assigned to the fluoroxy group.

Perfluoroethyl oxyfluoride is very stable. A sample which stood at room temperature for six weeks underwent no decomposition. Differential thermal analysis studies appear to indicate that the compound undergoes smooth decomposition between 110 and 200° C. Pentafluoroethyl oxyfluoride can be water-washed for periods up to one hour with no evidence of hydrolysis. Analytical data on a sample of chromatographed pentafluoroethyl oxyfluoride were as follows: Calculated for $C_2F_6O$: C, 15.6; F, 74.0; M.W., 148. Found C, 15.6; F, 74.9; M.W., 154.

The sample was found to have an oxidizing power of 12.34 milliequivalents of iodine per gram (calculated for 2-electron change, 13.0).

EXAMPLE 2

Hexafluoroacetone hydrate is prepared by the aqueous permanganate oxidation of perfluoroisobutylene according to the procedure of Morse et al., Can. J. Chem., 33, 453 (1955). The crude product, boiling at 55–56° C. at 80 mm., is used directly in the fluorination reaction. It contains about 75 percent hexafluoroacetone hydrate and also some diethyl ether and water.

A static bed procedure as described in Example 1 is used. A 4.0 g. sample of hexafluoroacetone hydrate (about 17 millimoles) is placed in a copper tray in a 450 ml. cylindrical copper vessel. The reactor is immersed in a cooling bath at about −20° C. and flushed with a stream of dry prepurified nitrogen to displace the air contained therein. Fluorine is introduced into the nitrogen stream, and the fluorine-nitrogen mixture is passed into the vessel. The volatile, entrained products formed are recovered from the effluent stream, which is passed through an iron tube containing granular sodium fluoride at room temperature to remove hydrogen fluoride and then through a trap immersed in liquid air. During the first hour a 3 percent (by volume) stream of fluorine in nitrogen is passed through the reactor at a rate of about .02 cubic ft./min. During the second hour a concentration of about 15 percent fluorine is passed through the reactor at a flow rate of about .01 cubic ft./min. The cooling bath is removed and the reaction mixture is allowed to warm to room temperature, while the 15 percent fluorine stream is continued for two more hours. After four hours, during which a total of 0.26 mole of fluorine is used, the fluorine flow is discontinued; the reaction vessel is then purged with nitrogen for ½ hour.

The contents of the liquid air trap are stored at liquid air temperature until workup, which is as follows: With the trap maintained at liquid air temperature, the non-condensable gases (chiefly nitrogen) are removed under reduced pressure, and the condensate is then allowed to warm slowly while it is fractionated at about 1 mm. pressure through traps designated A, B and C, successively. Trap A is cooled in a Dry Ice-trichloroethylene bath at about −78° C., trap B in a bromoethane slush bath at about −119° C. and trap C in liquid nitrogen at about −196° C. Trap B is found to contain about 11 millimoles of gaseous products of which at least 6 millimoles are oxyfluorides. The oxyfluoride present in largest amount is found to be heptafluoroisopropyl oxyfluoride, while pentafluoroethyl oxyfluoride is also contained in the mixture. The contents of trap B have an oxidizing power of 5.8 milliequivalents of iodine per gram of sample.

The fluoroxy compounds thus produced are concentrated by washing the crude mixture with water for 5–15 minutes. The mixture is stored at liquid air temperature until such time as the individual compounds are isolated in pure form by vapor phase chromatography. Heptafluoroisopropyl oxyfluoride is thus obtained and also pentafluoroethyl oxyfluoride.

Heptafluoroisopropyl oxyfluoride and pentafluoroethyl oxyfluoride are colorless gases which boil below room temperature. The $F^{19}$ nuclear magnetic resonance spectrum of heptafluoroisopropyl oxyfluoride contains an absorption at $-154.1\phi$, which has been assigned to the OF group. This absorption is split into two seven-fold peaks corresponding to the splitting from the CF and $(CF_3)_2$ structures. Other absorptions are observed at $137.4\phi$ (two seven-fold peaks) for the CF group and at $75.5\phi$ (double doublet) for the perfluoromethyl groups. The infrared spectrum of heptafluoroisopropyl oxyfluoride contains an absorption at 11.3 microns which is assigned to the fluoroxy group.

Analytical data were obtained on a sample of heptafluoroisopropyl oxyfluoride which was diluted with nitrogen gas.

*Analysis.*—Calculated for $C_3F_8O$ containing 45.0 percent $N_2$: C, 7.9; F, 33.5. Found: C, 8.2; F, 33.0.

EXAMPLE 3

The sodium salt of trifluoroacetic acid is fluorinated by the static bed procedure in a copper vessel as described above. A 1.4 g. sample of sodium trifluoroacetate (about 10.5 millimoles) is placed in a copper tray in the fluorinating vessel. The reactor is flushed with nitrogen. Fluorine is introduced into the nitrogen stream and the mixture is passed into the vessel. The effluent stream is passed through an iron tube containing sodium fluoride at room temperature to remove hydrogen fluoride (which is present in commercial fluorine) and then through a trap immersed in liquid air. A stream of about 5 percent (by volume) of fluorine in nitrogen is passed through the reactor at a flow rate of .02 cubic ft./min. for ½ hour and then a 10 percent stream at a flow rate of .007 cubic ft./min. for 5 hours. During this 5½ hour reaction period a total of 0.27 mole of fluorine is introduced into the reactor; the temperature inside the reactor varies from 15–19° C. The fluorine flow is discontinued and the reaction vessel is then purged with nitrogen for ½ hour. The residual material in the reactor is found to weigh about 0.5 g.; it consists principally of $NaHF_2$ and NaF.

The liquid air trap is found to contain 4.8 millimoles of condensed products. This mixture is chromatographed by the procedure described previously. It is found to contain about 23 percent pentafluoroethyl oxyfluoride, 18 percent 1,1-bis(fluoroxy)tetrafluoroethane, and also an amount of bis(fluoroxy)difluoromethane.

The $F^{19}$ nuclear magnetic resonance spectrum of bis(fluoroxy)difluoromethane, also called difluoromethylene bis(oxyfluoride) or perfluoromethylene bis(oxyfluoride), shows an absorption at $-159.2\phi$, which is assigned to the two equivalent OF groups. This absorption is split into a triplet by the $CF_2$ group. Another absorption is observed at $84.2\phi$ (also a triplet) for the $CF_2$ group. The infrared spectrum of bis(fluoroxy)difluoromethane shows the following absorptions: $7.84\mu(s)$, $8.03\mu(s)$, $8.32\mu(vs)$ and $10.85\mu(w)$. All these absorptions are complex in nature. The relative intensities of the absorptions are indicated by the symbols vs, s and w standing for very strong, strong and weak, respectively. Elemental analysis of a sample of chromatographed bis(fluoroxy)difluoromethane gave the following values:

*Analysis.*—Calculated for $CF_4O_2$: C, 10.0; F, 63.3; M.W., 120. Found: C, 10.3; F, 63.2; M.W., 122.

The material is a colorless gas, having a boiling point of about $-64°$ C.; no solid phase is evident at $-196°$ C.

Bis(fluoroxy)difluoromethane has good thermal stability. A sample remained unchanged upon heating for 6 hours at 150° C. in a sealed borosilicate glass tube. The same sample was then heated an additional 14 hours at 200° C. Approximately 80 percent of the original sample then remained. Another sample of bis(fluoroxy)difluoromethane, sealed in a borosilicate glass N.M.R. tube, showed no apparent change (determined by $F^{19}$ nuclear magnetic resonance) after standing more than two years at room temperature.

Bis(fluoroxy)difluoromethane rapidly oxidizes such substances as mercury, aqueous potassium iodide solution and aqueous alkali solutions. It also reacts with a wide variety of compounds containing carbon-hydrogen bonds. It can readily be manipulated in apparatus constructed of such materials as monel, stainless steel, dry borosilicate glass, copper and polychlorotrifluoroethylene. It is compatible with many other oxidants such as fluorine nitrate. When bis(fluoroxy)difluoromethane is heated above 200° C. in the presence of glass, decomposition occurs yielding products such as carbon dioxide and silicon tetrafluoride.

The $F^{19}$ nuclear magnetic resonance spectrum of 1,1-bis(fluoroxy)tetrafluoroethane, also called perfluoroethylidene bis(oxyfluoride), contains an absorption at $-150.4\phi$, which has been assigned to the OF groups. This absorption is split into two quadruplets caused by coupling with the CF and $CF_3$ structures. Other absorptions are observed at $111.8\phi$ (triplet) due to the CF group and at $77.4\phi$ (triplet) for the $CF_3$ group. The infrared spectrum of 1,1-bis(fluoroxy)tetrafluoroethane contains the following absorptions: $7.46\mu$ (m), $7.82\mu$ (m), $8.05\mu$ (vs), $8.28\mu$ (s), $8.71\mu$ (s), $9.24\mu$ (s), $10.82\mu$ (w), $11.18\mu$ (m) and $13.59\mu$ (m). The relative intensities of the absorptions are indicated by the symbols, vs, s, m and w, standing for very strong, strong, medium and weak, respectively.

Elemental analysis of a sample of chromatographed perfluoroethylidene bis(oxyfluoride) gave the following values:

*Analysis.*—Calculated for $C_2F_6O_2$: C, 14.1; F, 67.0; M.W., 170. Found: C, 14.1; F, 65.5; M.W. 164.

The mass spectrum of this material also supports the assigned structure. As is often the case, no parent peak (mass 170) was observed; peaks were observed at the following mass number: 135, 132, 116, 97, 85, 69, 66, 50, 47, 44, 35 and 31, corresponding to the ion fragments, $C_2F_5O^+$, $C_2F_4O_2^+$, $C_2F_4O^+$, $C_2F_3O^+$, $CF_3O^+$, $CF_3^+$, $CF_2O^+$, $CF_2^+$, $CFO^+$, $CO_2^+$, $OF^+$ and $CF^+$, respectively. 1,1-bis(fluoroxy)tetrafluoroethane had an ammediate oxidizing power of 21.1 milliequivalents of iodine per gram, 22.0 upon standing overnight. The value calculated for a two electron change is 23.5. The substance is a colorless gas. A slightly impure sample had a melting point of $-83°$ C. to $-77°$ C.; the estimated boiling point was $-30°$ C. Its density at 25° C. was found to be 1.35 g./ml., its critical temperature is 90° C. and the density at the critical point is 0.630 g./ml.

1,1-bis(fluoroxy)tetrafluoroethane has good thermal stability. A sample remained essentially unchanged after being heated for 6½ hours at 150° C. in a sealed borosilicate glass tube. Differential thermal analysis indicated no decomposition up to 200° C. Upon further heating, decomposition occurred yielding carbonyl fluoride, carbon dioxide and carbon tetrafluoride as the major products. Another sample of perfluoroethylidene bis(oxyfluoride), sealed in a borosilicate glass N.M.R. tube with $CFCl_3$ as an internal reference, showed no significant decomposition after standing at room temperature for 1 year, less than 10 percent decomposition after 1½ years, and approximately 30 percent decomposition after more than 2 years. When $CF_3CF(OF)_2$ is strongly heated in the presence of glass, the products formed ($CO_2$, $SiF_4$ and $O_2$) indicate that decomposition is due to attack of the strong fluorinating agent upon the glass. When 1,1-bis(fluoroxy)tetrafluoroethane is ignited or caused to flash with an appropriate reducing agent, carbon tetrafluoride, carbonyl fluoride and oxygen are formed. It reacts rapidly with reducing agents such as ferrocene or mercury, giving largely carbon dioxide and carbon tetrafluoride, together with ferricinium fluoride or fluorides of mercury, respectively. It also reacts with a wide variety of compounds containing carbon-hydrogen bonds. It can readily be manipulated in apparatus constructed of such materials as monel, stainless steel, dry borosilicate glass, copper, polychlorotrifluoroethylene, etc. It is compatible with many other oxidants such as fluorine nitrate.

EXAMPLE 4

The sodium salt of trifluoroacetic acid is fluorinated by the static bed procedure in a brass rectangular-shaped box reactor having a sintered monel plate suspended across it. The vessel is equipped with a gas inlet tube below the sintered plate and a gas outlet tube and brass blow-out cap above it. A 2.1 g. sample of sodium trifluoroacetate (about 15.6 millimoles) is spread out on the sintered plate in the fluorinating vessel. The reactor is flushed with nitrogen, fluorine is introduced into the nitrogen stream, and the mixture is passed into the vessel. The effluent stream is passed through an iron tube containing sodium fluoride at room temperature to remove hydrogen fluoride (which is present in commercial fluorine) and then through a trap immersed in liquid air. A stream of about 4 percent (by volume) of fluorine in nitrogen is passed through the reactor at a flow rate of .01 cubic ft./min. for 15 minutes, then a 20 percent stream at a flow rate of .007 cubic ft./min. for 1 hour, and finally a 34 percent stream at a flow rate of .004 cubic ft./min. for 2 hours. During this 3½ hour reaction period a total of 0.30 mole of fluorine is introduced into the reactor; the temperature inside the reactor varies from 17–22° C. The fluorine flow is discontinued and the reaction vessel is then purged with nitrogen for ½ hour. The residual material in the reactor is found to weigh about 0.6 g.; it consists principally of $NaHF_2$ and NaF.

The liquid air trap is found to contain 9.3 millimoles of condensed products. This mixture is separated chromatographically by the process described previously. In addition to perfluoroethyl oxyfluoride, 1,1-bis(fluoroxy)-tetrafluoroethane and bis(fluoroxy)difluoromethane, described above, the mixture contains a number of fluoroxy-peroxy compounds containing both —OF and —OO— groups, which are formed by coupling or combination of carbon-containing radicals. The column is maintained at 0° C. to speed the elution of the various higher boiling fluoroxy-peroxy compounds. Thes compounds are recovered as fractions having different retention times, in the usual way. They are conveniently identified by their nuclear magnetic resonance characteristics. Nuclear magnetic resonance data characterizing four examples of fluoroxy-peroxy compounds containing one OF group per molecule as well as two examples of fluoroxy-peroxy compounds containing one OF group on each of two different carbon atoms in the molecule are presented below:

(1) the $F^{19}$ nuclear magnetic resonance spectrum of perfluoroethyl fluoroxydifluoromethyl peroxide contains an absorption at $-157\phi$, which is assigned to the OF group. Other absorptions are observed at $80\phi$ for the adjacent $CF_2$ group, which is attached to another $CF_2$ group (absorption at $95\phi$) by means of a peroxide linkage. The $CF_3$ group absorbs at $83\phi$.

(2) The $F^{19}$ nuclear magnetic resonance spectrum of perfluoromethyl fluoroxydifluoromethyl peroxide contains an absorption at about $-158\phi$, which is assigned to the OF group. Other absorptions are observed at $80\phi$ for the adjacent $CF_2$ group and $69\phi$ for the $CF_3$ group.

(3) The $F^{19}$ nuclear magnetic resonance spectrum of perfluoroethyl 1-fluoroxytetrafluoroethyl peroxide contains an absorption at $-148\phi$, which is assigned to the OF group. Other absorptions are observed at $110\phi$, for the CF group, $78\phi$ for the $CF_3$ group attached to the CF group, $95\phi$ for the $CFC_2$ group and $83\phi$ for the $CF_3$ group of the perfluoroethyl group.

(4) The $F^{19}$ nuclear magnetic resonance spectrum of perfluoromethyl 1-fluoroxytetrafluoroethyl peroxide contains an absorption at $-147.5\phi$, which is assigned to the OF group. Other absorptions are observed at $110.5\phi$ for the CF group, $78.5\phi$ for the $CF_3$ group attached to the CF group, and $69\phi$ for the $CF_3$ group attached to the peroxide group.

(5) The $F^{19}$ nuclear magnetic resonance spectrum of fluoroxydifluoromethyl 1-fluoroxytetrafluoroethyl peroxide contains absorptions at $-157\phi$ and $-148\phi$, which are assigned to the OF groups attached to $CF_2$ and CF, respectively. Other absorptions are observed at $80\phi$ for the $CF_2$ group, $110\phi$ for the CF group and $78\phi$ for the $CF_3$ group.

(6) The $F^{19}$ nuclear magnetic resonance spectrum of bis(1-fluoroxytetrafluoroethyl) peroxide contains an absorption at $-149\phi$, which is assigned to the two identical OF groups. Other absorptions are at $110\phi$ for the CF groups and $78\phi$ for the $CF_3$ groups.

These fluoroxy-peroxy compounds can be stored at room temperature for several months without extensive decomposition. They are strong oxidizing agents toward mercury, aqueous potassium iodide solution and ferrocene.

EXAMPLE 5

Tetraethyl orthocarbonate is fluorinated in a cylindrical copper vessel, equipped with a gas inlet tube, a gas outlet tube, and a polytrifluorochloroethylene rupture disc. A 3.0 g. sample of tetraethyl orthocarbonate is placed in a copper tray in the fluorinating vessel. The reactor is immersed in a cooling bath at $-15$ to $-20°$ C. and flushed with nitrogen; fluorine is introduced into the nitrogen stream and the mixture is passed into the vessel. The effluent stream is passed through an iron tube containing sodium fluoride at room temperature to remove hydrogen fluoride and then through a trap immersed in liquid air. A stream of 15 percent (by volume) fluorine is passed through the reactor at a flow rate of .003 cubic ft./min. The fluorine flow is discontinued after a total of .39 mole of fluorine has been used, and the reaction vessel is purged with nitrogen.

The contents of the liquid air trap are worked up as follows: The non-condensable gases are removed from the trap at liquid air temperature under reduced pressure, and the condensate then allowed to warm slowly while it is fractionated at about .05 mm. pressure through traps designated A and B. Tray A is cooled in a fluorotrichloromethane slush bath $(-111°$ C.) and trap B in liquid nitrogen $(-196°$ C.). The mixture in trap B is found to contain pentafluoroethyl oxyfluoride. This compound is isolated in pure form by means of vapor phase chromatography by the procedure described previously.

EXAMPLE 6

The sodium salt of nonafluoro-t-butyl alcohol is fluorinated by the static bed procedure in a cylindrical copper vessel as set forth above. A 1.1 g. sample of the sodium salt of nonafluoro-t-butyl alcohol (about 4.4 millimoles) is placed in a copper tray in the fluorinating vessel. The reactor is immersed in a cooling bath at $-20°$ C. and flushed with nitrogen; then fluorine is introduced into the nitrogen stream and the mixture is passed into the vessel. The effluent stream is passed through an iron tube containing sodium fluoride at room temperature to remove hydrogen fluoride and then through a trap immersed in liquid air. A stream of 5 percent (by volume) fluorine in nitrogen is passed through the reactor at a flow rate of about .02 cubic ft/min. for 2½ hours (a total of .12 mole of fluorine). The fluorine flow is then discontinued and the cooling bath removed; the reaction vessel is thereafter purged with nitrogen for ½ hour.

The liquid air trap is found to contain 2.3 millimoles of nonafluoro-t-butyl oxyfluoride of about 95 percent purity. This material is isolated in pure form by chromatography by the procedure described previously.

The $F^{19}$ nuclear magnetic resonance spectrum of nonafluoro-t-butyl oxyfluoride displays an absorption in $-149.6\phi$, which is split into a 10-fold peak by the perfluoromethyl groups. A second absorption (a doublet) is observed at $69.5\phi$ for the $CF_3$ groups. The infrared spectrum of nonafluoro-t-butyl oxyfluoride contains an absorption at 11.3 microns, which is assigned to the oxyfluoride group. Elemental analysis of a sample of chromatographed nonafluoro-t-butyl oxyfluoride gave the following values:

Analysis.—Calculated for $C_4F_{10}O$: C, 18.9; F, 74.8; N.W., 254. Found: C, 18.9; F, 74.4; M.W., 252.

It has an oxiding power of 4.03 milliequivalent of iodine per gram (calculated for 1-electron, 3.93); in acidic ammonium molybdate medium the oxidizing power is 7.34 milli-equivalents per gram (calculated for 2-electron change, 7.87). A sample which stood at room temperature for four weeks underwent only about one-third decomposition. It does not react readily with water or acid; 98 percent sulfuric acid, for example, brought about less than 5 percent hydrolysis in 2 hours.

EXAMPLE 7

Nonafluoro-t-butyl alcohol is also directly fluorinated by the static bed procedure described previously to yield nonafluoro-t-butyl oxyfluoride. A 0.9 g. sample of the alcohol (about 3.7 millimoles) is treated at about $-20°$ C. with 0.12 mole of fluorine delivered over a five-hour period at a concentration of 5 percent in nitrogen and a flow rate of .02 cubic ft./min. to give 1.7 millimoles of nonafluoro-t-butyl oxyfluoride.

EXAMPLE 8

The sodium salt of undecafluorohexanoic acid (sodium perfluorocaproate, $C_5F_{11}CO_2Na$) is fluorinated in a cylindrical copper vessel as described above. A 1.02 g. sample of the sodium salt (about 3.0 millimoles) is placed in a copper tray in the fluorinating vessel. The reactor is flushed with nitrogen, and fluorine is introduced into the nitrogen stream. The effluent stream is passed through an iron tube containing sodium fluoride at room temperature, and then through a trap immersed in liquid air. A stream of about 5 percent (by volume) of fluorine in nitrogen is passed through the reactor at a flow rate of .02 cubic ft./min. for ½ hour, an 11 percent stream of fluorine at a flow rate of .008 cubic ft./min. for ½ hour and a 23 percent stream of fluorine at a flow rate of .01 cubic ft./ min. for 3 hours. During this 4 hour reaction period a total of 0.41 mole of fluorine is introduced into the reactor; the temperature inside the reactor is 17° C. The fluorine flow is discontinued and the reaction vessel is then purged with nitrogen for ½ hour. The residual material in the reactor is found to weigh about 0.17 g.

The contents of the liquid air trap are worked up as follows: The non-condensable gases are removed from the trap at liquid air temperature under reduced pressure, and the condensate then allowed to warm slowly while it is fractionated at about 0.1 mm. pressure through traps designated A and B. Trap A is cooled in solid-liquid slurry of bromoethane (−119° C.), and trap B in liquid nitrogen (−196° C.). Trap A is found to contain about ½ cc. of liquid perfluorohexyl oxyfluorides which are strongly oxidizing toward potassium iodide and toward ferrocene. The infrared spectrum of this material shows a characteristic peak at about 11.1 microns; the $F^{19}$ nuclear magnetic spectrum contains a peak at $-143\phi$, which is assigned to OF groups.

EXAMPLE 9

Sodium chlorodifluoroacetate ($ClCF_2CO_2Na$) containing about 50 percent sodium trifluoroacetate is fluorinated by the static bed procedure in a 1550 cc. cylindrical copper vessel, equipped with a gas inlet tube, a gas outlet tube, and a lead rupture disc. A 1.9 g. sample of the mixed salt described above (about 6 millimoles of sodium chlorodifluoroacetate) is placed in a copper tray in the fluorinating vessel. The reactor is flushed with a stream of nitrogen, and fluorine is introduced into the nitrogen stream. The volatile reaction products are passed through an iron tube containg sodium fluoride at room temperature and then through a trap immersed in liquid air. A stream of about 5 percent (by volume) of fluorine in nitrogen is passed through the reactor at a flow rate of .02 cubic ft./min. for 15 minutes, a 23 percent stream at a flow rate of .01 cubic ft./min. for 15 minutes and a 56 percent stream at a flow rate of .007 cubic ft./min. for 3 hours. During this 3½ hour reaction period a total of 0.68 mole of fluorine is introduced into the reactor; the temperature inside the reactor is 20° C. The fluorine flow is discontinued and the reaction vessel is then purged with nitrogen for ½ hour. The residual material in the reactor is found to weigh 0.8 g.

The liquid air trap is found to contain about 6.8 millimoles of condensed products. The condensate is fractionated at about 0.1 mm. pressure through traps designated A and B. Trap A is cooled in a bromoethane slush bath (−119° C.) and trap B in liquid nitrogen (−196° C.). 2-chlorotetrafluoroethyl oxyfluoride is isolated in pure form from this fraction by vapor phase chromatography as described previously.

Analysis of a sample of the chromatographed material gave the following result:

Calculated for $C_2F_5CCl$: C, 14.1; F, 55.7. Found: C, 14.0; F, 56.0.

The $F^{19}$ nuclear magnetic resonance spectrum of 2-chlorotetrafluoroethyl oxyfluoride contains an absorption at $-140.2\phi$, which is assigned to the OF group. This absorption is split into a triplet by the adjacent $CF_2$ group. Other absorptions are observed at $95.9\phi$ for the $CF_2$ group attached to the OF group and at $69.3\phi$ for the $CF_2$ group attached to the chlorine atom. The infrared spectrum of 2-chlorotetrafluoroethyl oxyfluoride contains characteristic absorption peaks in the 11.0–11.6 region.

EXAMPLE 10

The reaction product of hexafluoroacetone hydrate and sodium hydroxide is prepared as follows: To 12.8 g. of hexafluoroacetone hydrate (containing small amounts of water and diethyl ether) is added a solution of 2.16 g. of sodium hydroxide in 10 ml. of distilled water. After the addition the solution, which now tests neutral, is evaporated to dryness under vacuum at 50° C. The white, crystalline, hygroscopic residue, consisting of the monosodium salt of hexafluoroacetone hydrate, is used directly in the fluorination process. A sample of the sodium salt gave the following analysis:

Calculated for $C_3F_6HO_2Na$: C, 17.5; F, 55.3; Na, 11.2. Found: C, 18.0; F, 49.9; 46.9; Na, 11.2.

The fluorination reaction is carried out in the apparatus described in Example 1. A 1.5 g. sample of the reaction product of hexafluoroacetone hydrate and sodium hydroxide (about 7 millimoles) is placed in a copper tray in the reaction vessel. The reactor is immersed in a cooling bath at about −20° C. and flushed with a stream of dry prepurified nitrogen to displace air. Fluorine is introduced into the nitrogen stream and the mixture is passed into the vessel. The volatile, entrained products are recovered from the effluent stream, which is passed through an iron tube containing sodium fluoride at room temperature to remove hydrogen fluoride and then into a trap immersed in liquid air. During the first hour a 3 percent by volume stream of fluorine is passed through the reactor at a rate of about .02 cubic ft./min. For the next five hours a concentration of 15 percent and a flow rate of about .01 cubic ft./min. are maintained. After one hour at this concentration the cooling bath is removed and the reaction vessel allowed to warm to room temperature. At the end of six hours (total of 0.42 mole of fluorine) the flow of fluoride is discontinued and the reaction vessel is flushed with nitrogen for ½ hour. The residual material in the copper tray is found to weigh about 0.47 g.

The contents of the liquid air trap are worked up as follows: The non-condensable gases are removed from the trap at liquid air temperature under reduced pressure and the condensate is then fractionated at about 1 mm. pressure through the traps A, B and C, successively. Trap B is found to contain 1.5 millimoles of products, which consisted of heptafluoroisopropyl oxyfluoride and 2,2-bis-(fluoroxy)hexafluoropropane in major amounts and pentafluoroethyl oxyfluoride and 1,1-bis(fluoroxy)tetrafluoroethane in smaller amounts. Trap C is found to contain 2.5 millimoles of products, including some pentafluoroethyl oxyfluoride and 1,1-bis(fluoroxy)tetrafluoroethane. The pure oxyfluorides, the properties of three of which have been described above, are isolated from these mixtures by vapor phase chromatography as described above.

The $F^{19}$ nuclear magnetic resonance spectrum of 2,2-di-(fluoroxy)hexafluoropropane has an absorption at $-148.0\phi$, which is assigned to the OF group. This absorption is split into a seven-fold peak by the two perfluoromethyl groups. The absorption at $70.1\phi$ is a triplet and is assigned to the $CF_3$ groups. The infrared spectrum of this material shows an absorption at 11.3 microns, which is assigned to the fluoroxy groups. This compound is strongly oxidizing toward potassium iodide and toward ferrocene.

EXAMPLE 11

The fluorination process described above is carried out using a number of starting materials having varied substituents and chain lengths. These are fluorinated using the same procedure and apparatus described in Example 1. In each case about 5.0 millimoles are employed and the maximum temperature used is shown. The fluorine concentrations are gradually increased during the reaction to about 50 percent fluorine. The reaction periods vary from four to seven hours. The products obtained are set forth in the following table.

| Starting material | Maximum temp., °C. | Products |
|---|---|---|
| $NO_2CF_2CO_2Na$ | 25 | $NO_2CF_2CF(OF)_2$ and $NO_2CF_2CF_2OF$ |
| Polyvinylenylcarbonate | 15 | Poly(fluoroxy) containing solid with high oxidizing power. |
| $NaOOCCF_2-O-CF_2CO_2Na$ | 35 | Mixed oxyperfluorodiethyl oxyfluorides. |
| $Cl(CF_2CFCl)_3CF_2CO_2Na$ | 0 | Mixed fluorochloro oxyfluorides. |
| $CF_3(CF_2)_2CH_2OH$ | −10 | $CF_3(CF_2)_2CF_2OF$ |
| $(CF_2)_5CFCO_2Na$ | 35 | $(CF_2)_5CFCF(OF)_2$ and $(CF_2)_5CFCF_2OF$ |
| $CF_3(CF_2)_2C(CF_2)_2CF_3$ with $=O$ | −20 | $C_3F_7CFC_3F_7$ with $OF$ |
| $CF_3CFCF_3$ with $ONO$ | 0 | $CF_3CFCF_3$ with $OF$ |
| Sodium polyacrylate | 20 | Polymer containing fluoroxy groups. |
| $CF_2-C$ (with =O, O, O) $CF_2-C$ | 25 | $CF_2(OF)_2$, n-$C_3F_7OF$, $FOCF_2OCF_2OF$ and $FOCF_2CF_2CF_2CF_2OF$ |

EXAMPLE 12

The disodium salt of perfluoroadipic acid is fluorinated by the static bed procedure in a cylindrical copper vessel, equipped with a glass inlet tube, a gas outlet tube, and a lead rupture disc. A 0.93 g. sample of disodium octafluoroadipate (about 7.8 millimoles) is placed in a copper tray in the fluorinating vessel. The reactor is flushed with a stream of dry prepurified nitrogen, and fluorine is introduced into the nitrogen stream and the mixture is passed into the vessel. The volatile, entrained products of the reaction are recovered from the effluent stream, which is passed through an iron tube containing sodium fluoride at room temperature, and then through a trap immersed in liquid air. A stream of about 4 percent (by volume) of fluorine in nitrogen is passed through the reactor at a flow rate of .02 cubic ft./min. for 1 hour, an 11 percent stream at a flow rate of .02 cubic ft./min. for 1 hour and a 23 percent stream at a flow rate of .01 cubic ft./min. for 1 hour. During this 3 hour reaction period a total of 0.29 mole of fluorine is introduced into the reactor; the temperature inside the reactor is maintained at 17° C. The fluorine flow is discontinued and the reaction vessel is then purged with nitrogen for ½ hour. The residual material in the reactor is found to weigh about 0.37 g.

The contents of the liquid air trap are worked up as follows: The non-condensable gases are removed from the trap at liquid air temperature under reduced pressure, and the condensate then allowed to warm slowly while it is fractionated at about .1 mm. pressure through traps designated A and B. Trap A is cooled in solid-liquid slurry of bromoethane (−119° C.) and trap B in liquid nitrogen (−196° C.). Trap A is found to contain about 0.5 ml. of liquid, which proved to be strongly oxidizing toward potassium iodide and ferrocene. Owing to the starting material used, the mixture contains amounts of all possible active products, substituted with one, two, three or four fluoroxy groups. The infrared spectrum shows absorptions in the 11.0–11.5 micron region which are characteristic of OF groups.

EXAMPLE 13

The sodium salt of nonadecafluorodecanoic acid is fluorinated by the static bed procedure as described previously. A 0.93 g. sample of the sodium salt (about 2.8 millimoles) is placed in a copper tray in the fluorinating vessel and is subjected to the following fluorination treatment at 18° C.:

15 minutes, 5% fluorine, .02 cubic ft./min. gas flow rate,
30 minutes, 11% fluorine, .008 cubic ft./min. gas flow rate,
2.5 hours, 23% fluorine, .01 cubic ft./min. gas flow rate.

A total of 0.34 mole of fluorine is introduced into the reactor in this period. The residual material in the reactor is found to weigh about 0.15 g. and to consist mainly of $NaHF_2$.

The contents of the liquid air trap are worked up as follows: The non-condensable gases are removed from the trap at liquid air temperature under reduced pressure, and the condensate then allowed to warm slowly while it is fractionated at about 0.1 mm. presure through traps designated A and B. Trap A is cooled in dry ice-trichloroethylene (−78° C.) and trap B in liquid nitrogen (−196° C.). Trap A is found to contain about 250 mg. of a liquid which proved to be strongly oxidizing toward potasium iodide and toward ferrocene. The infrared spectrum shows absorptions at 11.1 and 11.3 microns which are in the region characteristic of OF groups. The product contains a mixture of mono- and difluoroxy-substituted perfluorodecanes.

EXAMPLE 14

Comercially available alloxan (3.0 g., about 18.8 millimoles) is fluorinated by the static bed procedure as described earlier under the following conditions:

11° C. 1.0 hr., 6% fluorine, .01 cubic ft./min. gas flow rate,
11° C. 1.0 hr., 12% fluorine, .10 cubic ft./min. gas flow rate,
14° C. 2.0 hrs., 40% fluorine, .005 cubic ft./min. gas flow rate.

A total of 0.87 mole of fluorine is introduced into the reaction vessel in this period.

The contents of the liquid air trap are worked up as follows: The non-condensable gases are removed from the trap at liquid air temperature under reduced pressure, and the condensate then allowed to warm slowly while it is fractionated at about 1 mm. pressure through traps designated A, B and C. Trap A is cooled in dry ice-trichloroethylene (−78° C.), trap B in a solid-liquid slurry of trichlorofluoromethane (−111° C.) and trap C in liquid nitrogen (−196° C.) Trap C is found to contain 2.8 millimoles of gaseous products. This crude mixture was chromatographed as described previously. It was found to contain pentafluoroethyl oxyfluoride, as well as another fluoroxy-substituent containing material having an N.M.R. absorption at about −129ϕ.

EXAMPLE 15

Bis(monofluorocarbonyl)peroxide is prepared by the reaction between fluorine, carbon monoxide and excess oxygen reported by Arvia et al., Angew. Chem., 72, 169 (1960). The $F^{19}$ nuclear magnetic resonance spectrum of this compound contains a single sharp peak at 34.1ϕ.

The fluorination of bis(monofluorocarbonyl)peroxide is conveniently carried out in a cylinder owing to the high volatility of this starting material, B.P. 16° C. A 0.25 millimole sample of bis(monofluorocarbonyl)peroxide is measured and transferred by means of a vacuum system into a dry 150 cc. monel cylinder, cooled by a liquid nitrogen bath (−196° C.). The cylinder, equipped with a valve, has been previously treated with fluorine to passivate the surface to further attack by fluorine. It also contains a small amount (0.5–1.0 g.) of dry cesium fluoride. Fluorine (0.66 millimole) is added to the cooled cylinder, the valve is closed and the liquid nitrogen bath replaced by a trifluoroethylene-solid carbon dioxide bath at −78° C. After 4½ hours, the cylinder is again cooled to liquid nitrogen temperature and any non-condensable gases are pumped away. The cylinder is then warmed to room temperature and the contents transferred to the vacuum line for subsequent work-up. Bis(fluoroxyperfluoromethyl)-peroxide and carbon dioxide are the major products together with small amounts of carbonyl fluoride as determined by $F^{19}$ nuclear magnetic resonance, infrared, and mass spectroscopy and molecular weight measurements.

The $F^{19}$ N.M.R. spectrum of bis(fluoroxyperfluoromethyl)peroxide, $FOCF_2OOCF_2OF$, contains an absorption at −157.8ϕ, which is assigned to the two OF groups. This absorption is split into a triplet by the $CF_2$ group. Another absorption (doublet) is observed at +82.3ϕ for the two $CF_2$ groups. The coupling constant between the OF and $CF_2$ groups is approximately 35 cycles per second. M.W.: calculated for $C_2F_6O_4$, 202; found, 205. The compound is a colorless gas possessing good thermal stability at room temperature. The compound is strongly oxidizing toward potassium iodide, mercury and ferrocene.

When fluoroxy group-containing compounds of the invention are mixed with lithium, hydrazine azide and a fluorocarbon polymer binder, the proportions being chosen to ensure substantially stoichiometric reaction, the composition which results can be ignited as by means of a squib, and large volumes of hot gases are produced.

What is claimed is:
1. Compounds of the formula:

$$X—R'_fOOR''_f—(OF)_n$$

wherein X is a member of the group consisting of fluorine and —OF; $R'_f$ and $R''_f$ are perfluoroalkyl radicals, the total number of carbon atoms in $R'_f$ and $R''_f$ taken together being from 2 to 18 carbon atoms; and $n$ is an integer from 1 to 2.

2. The compound bis(fluoroxyperfluoromethyl)peroxide.

3. The compound fluoroxy difluoromethyl 1-fluoroxytetrafluoroethyl peroxide.

4. The compound bis(1-fluoroxytetrafluoroethyl)peroxide.

References Cited

UNITED STATES PATENTS 2,689,254   9/1954   Cady et al. _____ 260—453

OTHER REFERENCES

Hoffman: Chemical Reviews, vol. 64, pp. 91 to 98 (1964).

Prager et al., J. Am. Chem. Soc., vol. 87, pp. 230 to 238 (1965).

CHARLES B. PARKER, *Primary Examiner.*

S. T. LAWRENCE III, *Assistant Examiner.*

U.S. Cl. X.R.

44—77; 149—35, 36; 252—186, 386; 260—999

UNITED STATES PATENT OFFICE
CERTIFICATE OF CORRECTION

Patent No. 3,420,866                                        January 7, 1969

Julianne H. Prager et al.

It is certified that error appears in the above identified patent and that said Letters Patent are hereby corrected as shown below:

Column 7, line 17, "dioxide-trichlorothylene" should read -- dioxide-trichloroethylene --. Column 11, line 32, "$CFC_2$" should read -- $CF_2$ --. Column 12, line 45, "N.W." should read -- M.W. --; line 46, "milliequivalent" should read -- milliequivalents --. Column 13, line 61, "$C_2F_5CCl$" should read -- $C_2F_5OCl$ --. Column 15, line 39, "glass" should read -- gas --.

Signed and sealed this 31st day of March 1970.

(SEAL)
Attest:

Edward M. Fletcher, Jr.                                 WILLIAM E. SCHUYLER, JR.
Attesting Officer                                                 Commissioner of Patents